(12) United States Patent
Liang et al.

(10) Patent No.: US 9,406,183 B2
(45) Date of Patent: Aug. 2, 2016

(54) VALUABLE DOCUMENT AUTHENTICATION METHOD AND DEVICE

(71) Applicant: GRG Banking Equipment Co., Ltd., Guangzhou, Guangdong (CN)

(72) Inventors: Tiancai Liang, Guangzhou (CN); Yuanchao Yu, Guangzhou (CN); Weifeng Wang, Guangzhou (CN); Kun Wang, Guangzhou (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 14/426,969

(22) PCT Filed: Apr. 2, 2013

(86) PCT No.: PCT/CN2013/073647
§ 371 (c)(1),
(2) Date: Mar. 9, 2015

(87) PCT Pub. No.: WO2014/056311
PCT Pub. Date: Apr. 17, 2014

(65) Prior Publication Data
US 2015/0220936 A1     Aug. 6, 2015

(30) Foreign Application Priority Data

Oct. 8, 2012  (CN) .......................... 2012 1 0378191

(51) Int. Cl.
*G07D 7/20* (2016.01)
*G07D 7/04* (2016.01)
(Continued)

(52) U.S. Cl.
CPC .......... *G07D 7/2058* (2013.01); *G06K 9/00577* (2013.01); *G07D 7/04* (2013.01);
(Continued)

(58) Field of Classification Search
CPC ....... G07D 7/04; G07D 7/164; G07D 7/2008; G07D 7/2058; G06K 9/00577; G06K 9/2009; G06K 9/0059; G06Q 30/0185; G06Q 50/18
See application file for complete search history.

(56) References Cited

U.S. PATENT DOCUMENTS

| 5,790,693 A | 8/1998 | Graves et al. |
| 8,345,947 B2 * | 1/2013 | Koretsune ................ G07D 7/04 |
| | | 250/559.01 |

(Continued)

FOREIGN PATENT DOCUMENTS

| CN | 101520912 A | 9/2009 |
| CN | 101925931 A | 12/2010 |

(Continued)

OTHER PUBLICATIONS

International Search Report dated Jul. 11, 2013 from corresponding International Application No. PCT/CN2013/073647.

(Continued)

*Primary Examiner* — Katrina Fujita
(74) *Attorney, Agent, or Firm* — Wolf, Greenfield & Sacks, P.C.

(57) ABSTRACT

A valuable document authentication method and device. Whether a valuable document, an image sensor or a first sensor has shifted or not, the effect of authenticating the valuable document will not be affected, because a reference unit is needed to determine the location relationship between the image sensor and the first sensor before the valuable document is authenticated, thereby preventing an error occurring with the authenticated valuable document due to the fact that each sensor has shifted; moreover, when the valuable document is authenticated, even if the valuable document has shifted, the correctness of the valuable document authenticated can also be guaranteed by the conversion of the location relationship between a detection object and the sensor. Therefore, the solution provided in the present invention improves the identification accuracy and working efficiency of the authentication device, thereby providing convenience for users.

8 Claims, 12 Drawing Sheets

(51) Int. Cl.
*G07D 7/16* (2016.01)
*G06K 9/00* (2006.01)
*G06Q 30/00* (2012.01)
*G06Q 50/18* (2012.01)

(52) U.S. Cl.
CPC ............ *G07D 7/164* (2013.01); *G07D 7/2008* (2013.01); *G06K 2009/0059* (2013.01); *G06Q 30/0185* (2013.01); *G06Q 50/18* (2013.01)

(56) References Cited

U.S. PATENT DOCUMENTS

| 8,948,489 | B2 * | 2/2015 | Ikemoto | G07D 7/2058 209/534 |
|---|---|---|---|---|
| 2002/0039206 | A1 | 4/2002 | Mukai | |
| 2003/0021459 | A1 | 1/2003 | Neri et al. | |
| 2013/0121539 | A1 * | 5/2013 | Liang | G07D 7/2058 382/112 |
| 2013/0129140 | A1 * | 5/2013 | Liang | G07D 7/00 382/100 |
| 2014/0126803 | A1 * | 5/2014 | Yu | H04N 1/387 382/135 |
| 2014/0205177 | A1 * | 7/2014 | Liang | G07D 7/074 382/135 |
| 2015/0217591 | A1 * | 8/2015 | Liang | G07D 7/00 235/375 |

FOREIGN PATENT DOCUMENTS

| CN | 102890841 A | 1/2013 |
|---|---|---|
| EP | 2 251 839 A1 | 11/2010 |

OTHER PUBLICATIONS

Extended European Search Report dated Aug. 27, 2015 from corresponding European Application No. 13 84 4647.1.
Written Opinion of the International Searching Authority, dated Jul. 11, 2013, from corresponding International Application No. PCT/CN2013/073647.

* cited by examiner

VALUABLE DOCUMENT AUTHENTICATION METHOD AND DEVICE

CROSS REFERENCE TO RELATED APPLICATION

This application is the US national phase of International Application No. PCT/CN2013/073647 filed on Apr. 2, 2013, which claims the priority of Chinese Patent Application No. 201210378191.6, titled "METHOD AND DEVICE FOR IDENTIFYING VALUABLE DOCUMENT", filed with the State Intellectual Property Office of PRC on Oct. 8, 2012, which applications are hereby incorporated by reference to the maximum extent allowable by law.

FIELD OF THE INVENTION

The present disclosure relates to the field of identifying a valuable document, and in particular to a method and a device for identifying a valuable document.

BACKGROUND OF THE INVENTION

With the development of economy, science and technology, self-service equipment becomes more and more popular in the financial field (e.g., an ATM in a bank) and in the pan-financial field (e.g., a self-service ticket vending machine, self-service payment machine and the like in the rail transit industry). It can be foreseeable that financial self-service equipment will become closer to people's daily life and higher requirements for the performance of the financial self-service equipment will be made in the future.

In an automatic teller machine (ATM) of a financial institution such as a bank, a valuable document identification device is equipped, which is used to identify the category and authenticity of a current valuable document by identifying the feature of the current valuable document (e.g., banknote). In the ATM, template information of various types of valuable documents are stored, the template information includes the image signal, magnetic signal and thickness signal. When a valuable document is loaded in the identification device, the image signal of the current valuable document is collected by an image sensor of the identification device, the magnetic signal of the current valuable document is collected by a magnetic sensor of the identification device, and the thickness signal of the current valuable document is collected by a thickness sensor of the identification device. Then, the collected image signal, magnetic signal and thickness signal are compared with the image signal, magnetic signal and thickness signal in the template information respectively. If the collected signals are the same as the signals in the template information, it indicates that the current valuable document is real; otherwise, it indicates that the current valuable document is fake. Therefore, based on the identification of an image signal, a magnetic signal and a thickness signal, the identification of the category and authenticity of a current valuable document can be achieved.

In researching and practicing the existing technologies, the inventor of the present invention finds that the prior art has the following disadvantages.

The image signal, magnetic signal and thickness signal stored in template information of an automatic teller machine are collected in a case that multiple sensors are always parallel to the long side of a valuable document. But in practice, the valuable document is often transported in an inclined and deviated manner in the automatic teller machine, thus signals collected by the sensors of the identification device are signals in a condition where the valuable document is inclined or offset. Therefore, when the signals collected in the inclined manner are compared with signals in the template information in the identification device, the identification device determines that the current valuable document is fake or a case where the identification device can not judge the authenticity occurs due to the difference between the signals of the corresponding positions on the current valuable document and in the template information, even though the current valuable document is real.

In the use of an automatic teller machine by a user, once a valuable document is not placed rightly, a case that judgment can not be performed or misjudgment of fake banknote will occur in the identification device of the automatic teller machine, then the user will be asked to places the valuable document again. The identification device can identify and process correctly only after several times of insertion of the same valuable document. Therefore, existing identification devices have lowered identification accuracy for a valuable document, and reduced efficiency, thus causing inconvenience to a user and affecting the usage experience of self-service equipment by a user.

Therefore, how to improve the identification accuracy of an identification device has become the problem mostly needed to be solved currently.

SUMMARY OF THE INVENTION

For this purpose, the object of the present invention is to provide a method and a device for identifying a valuable document, to improve the identification accuracy of the identification device.

An embodiment of the present invention can be implemented as below.

A method for identifying a valuable document includes:

collecting an image signal and a first signal of a detection object by an image sensor and a first sensor respectively, where the detection object includes the valuable document and a reference unit;

determining an image signal of the valuable document from the image signal of the detection object;

determining a positional relationship between the image sensor and the first sensor according to a positional relationship between the image sensor and the reference unit and a positional relationship between the first sensor and the reference unit, if an image signal of the valuable document on a preset region matches with an image signal of template information on the preset region, where the template information includes an image signal and a second signal;

determining the second signal of the template information at a preset position;

determining a positional relationship between the preset position on the detection object and the image sensor;

determining a positional relationship between the preset position on the detection object and the first sensor according to the positional relationship between the image sensor and the first sensor; and judging whether the first signal of the detection object at the preset position collected by the first sensor is the same as the second signal of the template information at the preset position, and if the first signal of the detection object at the preset position collected by the first sensor is the same as the second signal of the template information at the preset position, displaying that the valuable document is real; otherwise, displaying that the valuable document is fake.

Preferably, the first sensor may be a magnetic sensor, and each of the first signal and the second signal may be a magnetic signal.

Preferably, the first sensor may be a thickness sensor, and each of the first signal and the second signal may be a thickness signal.

Preferably, the first sensor may include a magnetic sensor and a thickness sensor, and each of the first signal and the second signal may include a magnetic signal and a thickness signal.

A device for identifying a valuable document includes:

an image sensor, adapted to collect an image signal of a detection object, where the detection object includes the valuable document and a reference unit;

a first sensor, adapted to collect a first signal of the detection object;

a first determining module, adapted to determine an image signal of the valuable document from the image signal of the detection object;

a second determining module, adapted to determine a positional relationship between the image sensor and the first sensor according to a positional relationship between the image sensor and the reference unit and a positional relationship between the first sensor and the reference unit, if an image signal of the valuable document on a preset region matches with an image signal of template information on the preset region, where the template information includes an image signal and a second signal;

a third determining module, adapted to determine the second signal of the template information at a preset position;

a fourth determining module, adapted to determine a positional relationship between the preset position on the detection object and the image sensor;

a fifth determining module, adapted to determine a positional relationship between the preset position on the detection object and the first sensor according to the positional relationship between the image sensor and the first sensor;

a judging module, adapted to judge whether the first signal of the detection object at the preset position collected by the first sensor is the same as the second signal of the template information at the preset position; and a displaying module, adapted to display that the valuable document is real or fake.

Preferably, the first sensor may be a magnetic sensor, and each of the first signal and the second signal may be a magnetic signal.

Preferably, the first sensor may be a thickness sensor, and each of the first signal and the second signal may be a thickness signal.

Preferably, the first sensor may include a magnetic sensor and a thickness sensor, and each of the first signal and the second signal may include a magnetic signal and a thickness signal.

Compared with the prior art, the technical solution according to the embodiment has the following advantages and features.

In the solution according to the present invention, the effect of the identification of a valuable document will not be affected, no matter whether the valuable document, the image sensor or the first sensor is deviated, because the positional relationship between the image sensor and the first sensor needs to be determined by a reference unit prior to the identification of the valuable document, so that errors in identification of the valuable document caused by deviation of various sensors can be avoided. Further, in the identification of the valuable document, the correctness of the valuable document identification can be guaranteed by conversion of the positional relationship between the detection object and the sensors, even though the valuable document is deviated. Therefore, according to the solution of the present invention, the identification accuracy and efficiency of the identification device can be improved, and the convenience can be provided to a user.

BRIEF DESCRIPTION OF THE DRAWINGS

The figures to be used in the description of the embodiment or the prior art will be introduced briefly below so as to better describe the technical solution of the present disclosure or the prior art. Apparently, the accompanying figures used in the following description are only some embodiments of the present disclosure, and other figures can be obtained by those skilled in the art according to these accompanying figures without creative labor.

DETAILED DESCRIPTION OF THE INVENTION

The technical solution in embodiments of the present disclosure will be described clearly and fully in conjunction with the accompanying figures. Apparently, the described embodiments are only a part of the embodiments of the present disclosure rather than all the embodiments. All other embodiments obtained by those skilled in the art based on the embodiments of the present disclosure without creative labor are within the scope of protection of the present disclosure.

A method and a device for identifying a valuable document are provided according to the embodiment of the present invention, to improve the identification accuracy and efficiency of the identification device, and thus provide a user with convenience.

There are multiple ways to implement specifically the above method and device for identifying a valuable document, thus the method and device will be described in detail by specific embodiments below.

Figure 1:
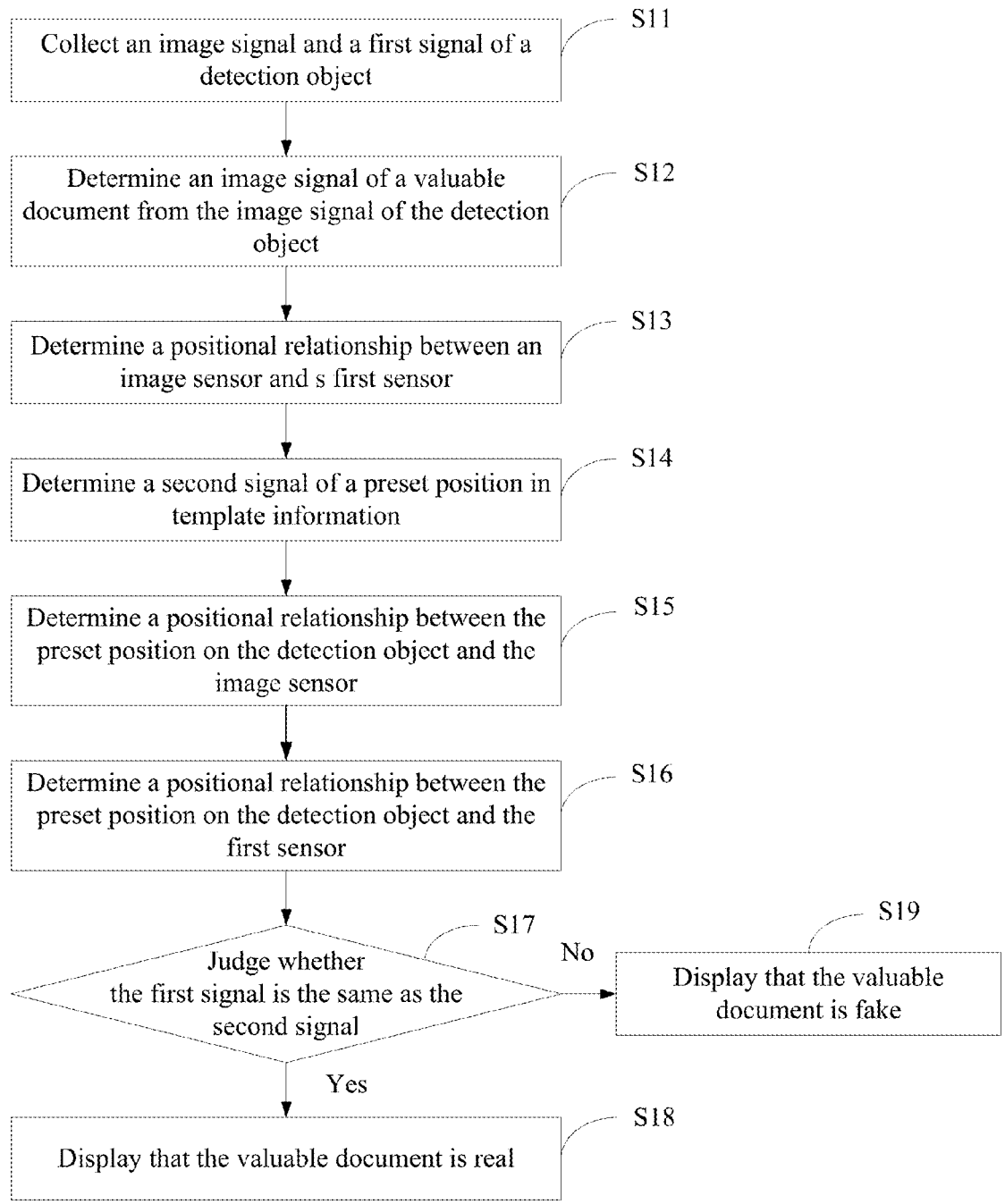
FIG. 1 is a flow chart of a method for identifying a valuable document according to the present invention.

Referring to FIG. 1, a flow chart of a method for identifying a valuable document is illustrated, which includes:

Step S11, collecting an image signal and a first signal of a detection object by an image sensor and a first sensor respectively, where the detection object includes the valuable document and a reference unit.

Herein, the first sensor may be a magnetic sensor or a thickness sensor, or the first sensor includes a magnetic sensor and a thickness sensor. However, the design idea of the present invention is not limited to these two types of sensors or their combination, and the sensor may be other types of sensors. The signal collected from a valuable document by a magnetic sensor is a magnetic signal, and the signal collected from a valuable document by a thickness sensor is a thickness signal.

Step S12, determining an image signal of the valuable document from the image signal of the detection object.

Herein, the detection object includes the valuable document and the reference unit, and the image signal of the valuable document needs to be used in the following steps, so it is necessary to cut the image signal of the valuable document from the image signal of the detection signal.

Step S13, determining a positional relationship between the image sensor and the first sensor according to a positional relationship between the image sensor and the reference unit and a positional relationship between the first sensor and the reference unit, when an image signal of the valuable document on a preset region matches with an image signal of template information on the preset region, where the template information includes the image signal and a second signal.

Herein, the preset region may be big or small, and may be preset by a staff member as the region of head portraits on a RMB for example. If the image signal of the valuable document matches with the image signal of the template information, the denomination of the valuable document is determined to be 50 yuan by using the denomination of the current template information such as 50 yuan. In this step, only the denomination of the valuable document placed by a user can be judged rather than the authenticity of the valuable document.

Step S14, determining the second signal of the template information at a preset position.

Herein, the second signal on the preset position may be a magnetic signal or a thickness signal, or may be the magnetic signal and the thickness signal.

Step S15, determining a positional relationship between the preset position on the detection object and the image sensor.

Step S16, determining a positional relationship between the preset position on the detection object and the first sensor according to the positional relationship between the image sensor and the first sensor.

Herein, the positional relationship between the preset position on the detection object and the first sensor is further determined by the above two steps.

Step S17, judging whether the first signal of the detection object at the preset position collected by the first sensor is the same as the second signal of the template information at the preset position, and if the first signal of the detection object at the preset position collected by the first sensor is the same as the second signal of the template information at the preset position, proceeding to step S18; otherwise proceeding to step S19, Herein, the above judgment is an error correction judgment, i.e., to judge whether the first signal of the detection object is the same as the second signal of the template information, which is a signal obtained in ideal conditions. The correctness of the judgment will not be affected even though the first signal is obtained in a deviated condition, because a conversion of positional relationship is performed.

Step S18, displaying that the valuable document is real.

Step S19, displaying that the valuable document is fake.

In the embodiment as shown in FIG. 1, the effect of the identification of a valuable document will not be affected, no matter whether the valuable document, the image sensor or the first sensor is deviated, because the positional relationship between the image sensor and the first sensor needs to be determined by a reference unit prior to the identification of the valuable document, so that errors in identification of the valuable document caused by deviation of various sensors is avoided. Further, in the identification of the valuable document, the correctness of the valuable document identification can be guaranteed by conversion of the positional relationship between the detection object and the sensors even though the valuable document is deviated. Therefore, according to the solution of the present invention, the identification accuracy and efficiency of the identification device is improved, and thus providing a user with convenience.

Figure 2:
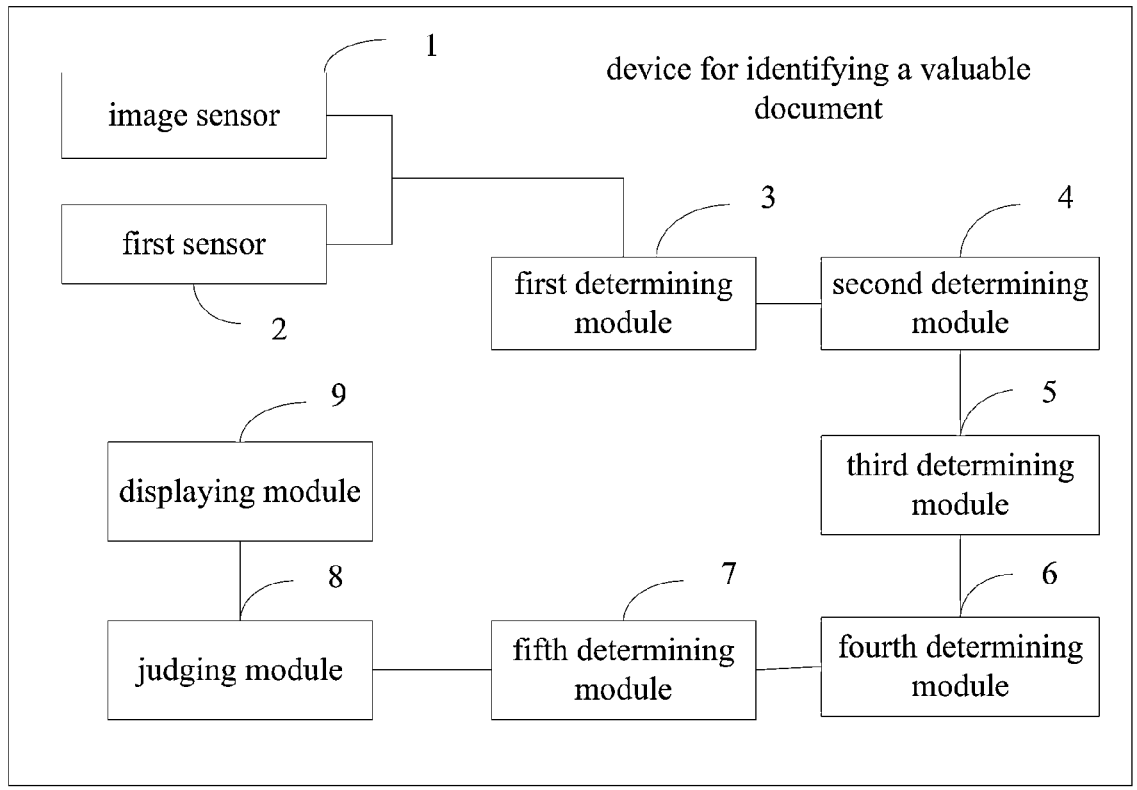
FIG. 2 is a block diagram of a device for identifying a valuable document according to the present invention.

Referring to FIG. 2, a block diagram of a device for identifying a valuable document is illustrated, which includes: an image sensor 1 adapted to collect an image signal of a detection object, here the detection object includes the valuable document and a reference unit; a first sensor 2 adapted to collect a first signal of the detection object; a first determining module 3 adapted to determine an image signal of the valuable document from the image signal of the detection object; a second determining module 4 adapted to determine a positional relationship between the image sensor and the first sensor according to a positional relationship between the image sensor and the reference unit and a positional relationship between the first sensor and the reference unit, when an image signal of the valuable document on a preset region matches with an image signal of template information on the preset region, here the template information includes the image signal and a second signal; a third determining module 5 adapted to determine the second signal of the template information on a preset position; a fourth determining module 6 adapted to determine a positional relationship between the preset position on the detection object and the image sensor; a fifth determining module 7 adapted to determine a positional relationship between the preset position on the detection object and the first sensor according to the positional relationship between the image sensor and the first sensor; a judging module 8 adapted to judge whether the first signal of detection object on the preset position collected by the first sensor is the same as the second signal of the template information on the preset position; and a displaying module 9 adapted to display that the valuable document is real or fake.

The design idea of the present invention has been summarized briefly above, and the solution of the present disclosure will be introduced below in conjunction with specific embodiments. The design thought for detecting the magnetic signal and the thickness signal are almost the same, so only the detecting of the magnetic signal portion will be introduced below. A precise locating and detecting of the thickness signal collected by the thickness sensor, which will be omitted to avoid repetition, can be implemented by using the same implementation method as that of the magnetic signal according to the principle for detecting the magnetic signal, to achieve the final identification of the current valuable document.

First Embodiment

This embodiment provides specific introduction of a method for identifying a valuable document according to the present invention.

The method for identifying a valuable document includes:

Step 1, sensing a current valuable document.

Figure 3:
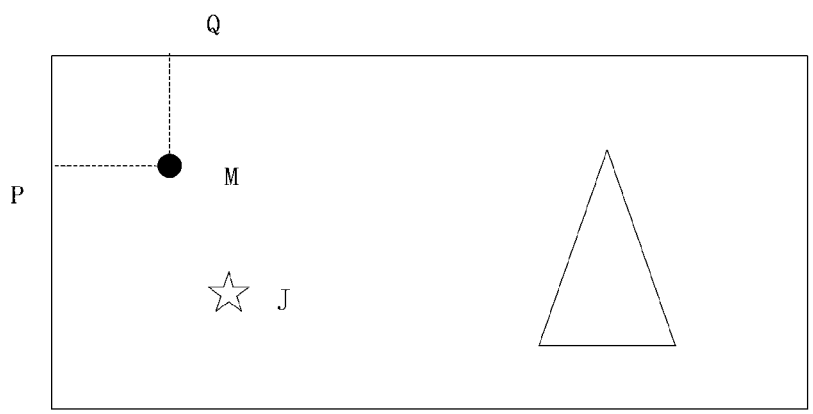
FIG. 3 is a schematic diagram of an image of a valuable document according to the present invention.

FIG. 3 is a physical shape diagram of the current valuable document. The valuable document (e.g., banknote) to be identified is transported through a transporting passage, a detecting sensor for sensing the arrival of the current valuable document and obtaining the transporting speed V (inch/second) of the current valuable document according to the setting data of the equipment is provided in the transporting passage.

Step 2, controlling cooperatively.

A cooperative controlling portion controls a close-loop type conveyor belt to operate at a linear speed in accordance with the transporting speed V of the valuable document, when the front of the valuable document arrives at the detection range of the detecting sensor. A reference unit is transported by the close-loop type conveyor belt to pass by an image sensor, a magnetic sensor and a thickness sensor in this order from a starting position at a constant speed.

Step 3, collecting an image.

The image sensor consists of a transmission sensor for detecting a transmitted image and a reflection sensor for detecting a reflected image. When the front of the current valuable document arrives at the detection range of the detecting sensor, the image sensor starts to operate, and the transmission image and the reflection image of the reference unit and the current valuable document are obtained by an image data acquiring portion in a manner of progressive scan.

Step 4, collecting a magnetic signal.

A magnetic signal acquiring portion consists of the magnetic sensor for detecting magnetic signal data of the reference unit and current valuable document. When the beginning of the current valuable document arrives at the detecting sensor, the magnetic sensor starts to operate, and the magnetic signal data of the reference unit and the current valuable document are obtained by the magnetic signal acquiring portion in a manner of progressive scan.

Step 5, collecting a thickness signal.

When the front of the current valuable document arrives at the detection range of the detecting sensor, the thickness sensor starts to operate, and the thickness signal data of the reference unit and the current valuable document are obtained by a thickness signal acquiring portion in a manner of progressive scan.

Step 6, stopping signal collection.

Data collection work of the image sensor, magnetic sensor and the thickness sensor are stopped when time T (second) has passed ever since the front of the current valuable document arrives at the detection range of the detecting sensor.

Figure 4:
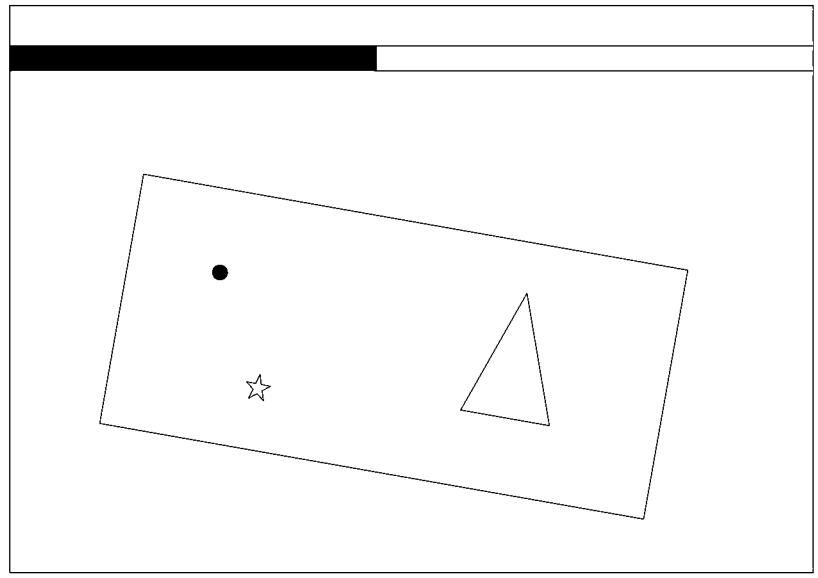
FIG. 4 is a schematic diagram of an image collected by an image sensor according to the present invention.

FIG. 4 are images of the reference unit and the current valuable document collected by the image sensor.

The number of rows of the image data is:

$$R = VTL_i \quad \text{(Equation 6.1).}$$

The number of columns of the image data is:

$$C = \Phi T_i \quad \text{(Equation 6.2).}$$

For the image sensor, the horizontal width is $\Phi$ inch, the horizontal resolution is $T_i$ dpi, and the vertical resolution is $L_i$ dpi.

Due to the line scan performed by the magnetic sensor, the magnetic signal data collected in one time are N discrete data, where N is the number of heads of the magnetic sensor. The whole magnetic signal data of the current valuable document is a numerical matrix Mag with M rows and N columns, as shown in Equation 6.3:

$$Mag = \begin{pmatrix} d_{00} & d_{01} & \cdots & d_{0,N-1} & d_{0N} \\ d_{10} & d_{11} & \cdots & d_{1,N-1} & d_{1N} \\ \vdots & \vdots & & \vdots & \vdots \\ d_{M-1,0} & d_{M-1,1} & \cdots & d_{M-1,N-1} & d_{M-1,N} \\ d_{M,0} & d_{M,1} & \cdots & d_{M,N-1} & d_{M,N} \end{pmatrix}, \quad \text{(Equation 6.3)}$$

where $M = VTL_m$.

Similarly, due to the line scan performed by the thickness sensor, the thickness signal data collected in one time are T discrete data, where T is the number of the thickness sensors. The full thickness signal data of the current valuable document is a numerical matrix Thi with K rows and T columns, as shown in Equation 6.4:

$$Thi = \begin{pmatrix} t_{00} & t_{01} & \cdots & t_{0,T-1} & t_{0T} \\ t_{10} & t_{11} & \cdots & t_{1,T-1} & t_{1T} \\ \vdots & \vdots & & \vdots & \vdots \\ t_{K-1,0} & t_{K-1,1} & \cdots & t_{K-1,T-1} & t_{K-1,T} \\ t_{K,0} & t_{K,1} & \cdots & t_{K,T-1} & t_{K,T} \end{pmatrix}, \quad \text{(Equation 6.4)}$$

where $K = VTL_t$.

Step 7, identifying the image.

Step 7.1, cutting the image.

Preliminary identification is performed on the current valuable document using the image data collected by the image sensor. Since the position of a foreground region in the whole image, which is useful for identifying, is uncertain, the foreground region should be cut from the whole image by boundary detecting and image cutting at first.

Figure 5:
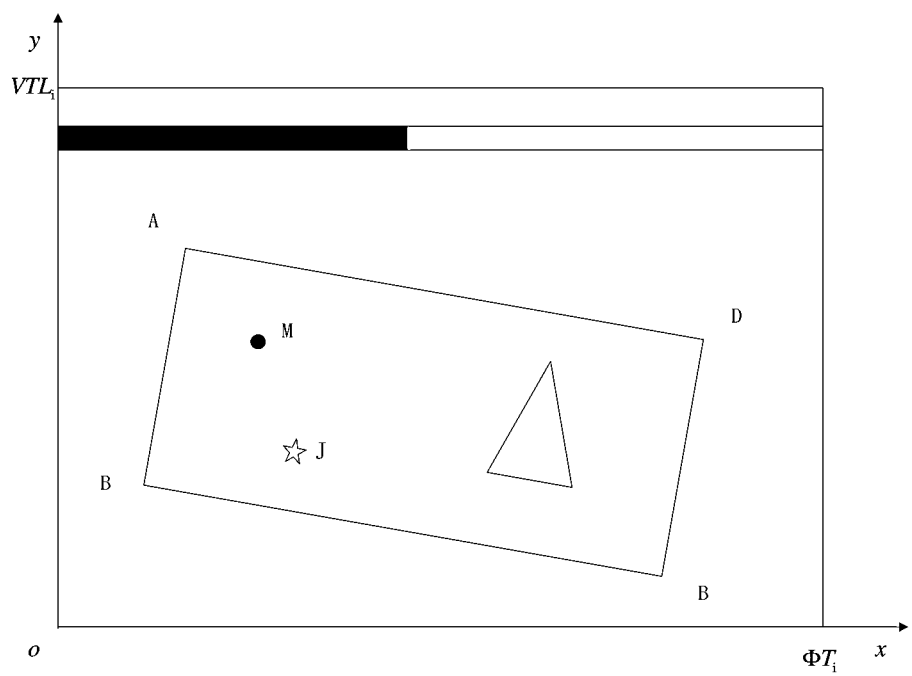
FIG. 5 is a schematic diagram of an image in a coordinate system xoy according to the present invention.

A coordinate system xoy (i.e., pixel coordinate system, each point in the coordinate system represents a pixel point) is set up, in which the direction of a straight line where the left boundary of the whole image collected by the image sensor lies is used as the y axis, the direction of a straight line where the lower boundary of the whole image collected by the image sensor lies is used as the x axis, and the lower left vertex of the whole image collected by the image sensor is used as the origin, as shown in FIG. 5.

It is assumed that the four vertexes of the foreground region are A, B, C and D respectively. It can be obtained by detecting boundary points of the foreground region and then performing linear fit with the boundary points that, the equation of the left boundary straight line (i.e., the equation of a straight line where side AB lies) is:

$$y = k_1 x + b_1 \quad \text{(Equation 7.1),}$$

the equation of the right boundary straight line (i.e., the equation of a straight line where side CD lies) is:

$$y = k_2 x + b_2 \quad \text{(Equation 7.2),}$$

the equation of the upper boundary straight line (i.e., the equation of a straight line where side AD lies) is:

$$y=k_3x+b_3 \quad \text{(Equation 7.3)},$$

and the equation of the lower boundary straight line (i.e., the equation of a straight line where side BC lies) is:

$$y=k_4x+b_4 \quad \text{(Equation 7.4)}.$$

Figure 6:
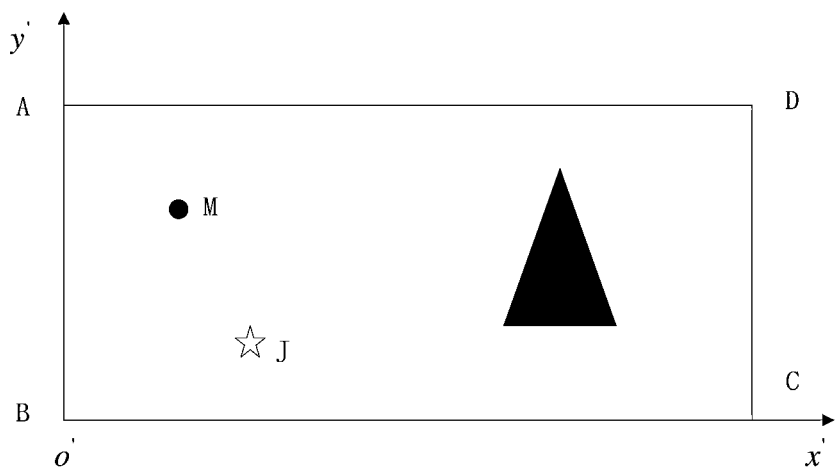
FIG. 6 is a schematic diagram of an image in a coordinate system x'o'y' according to the present invention.

The image cutting is performed according to the above four boundary straight lines of the foreground region, and rotation correcting is performed on the cut foreground region by using existing image rotation technique. A coordinate system x'o'y' set up, in which the direction of a straight line where the left boundary of the foreground region of the current valuable document lies is used as ordinate direction, the direction of a straight line where the lower boundary of the foreground region of the current valuable document lies is used as abscissa direction, and the lower left vertex of the foreground region of the current valuable document is used as the origin, as shown in FIG. 6.

Step 7.2, template matching and identifying of image features.

Figure 7:
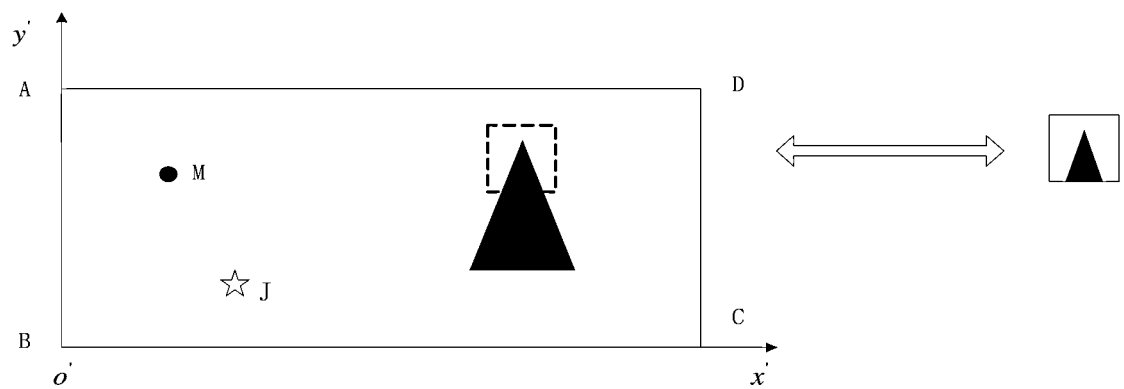
FIG. 7 is a schematic diagram of a comparison between an image in a coordinate system x'o'y' and a template image according to the present invention.

As shown in FIG. 7, corresponding positions of the foreground region are selected to perform template matching and identifying, according to standard template data stored in a storing portion after completing above operations. An image identification result is obtained by template matching and identifying, and if the image identification fails, the current valuable document is exited. To simplify description, it is assumed that the identification result is a right-side-up and upright RMB 100 yuan.

Step 8, identifying magnetic signal.

According to the above assumptions, the image identifying of the current valuable document is achieved through the identifying solution, and the identification result is a CNY 100 yuan. M on a banknote can be magnetized (the magnetic signal fluctuates severely) according to priori knowledge. To check whether the magnetic signal of the current valuable document meets the requirement of the magnetic signal feature of the CNY 100 yuan at M, it is necessary to determine the position of the magnetic signal of the current valuable document at M in the whole magnetic signal collected by the magnetic sensor at first.

Step 8.1, determining the physical positional relationship between the image sensor and the reference unit.

(1) determining the coordinate of the center W of the reference unit in the pixel coordinate system xoy.

Figure 8:
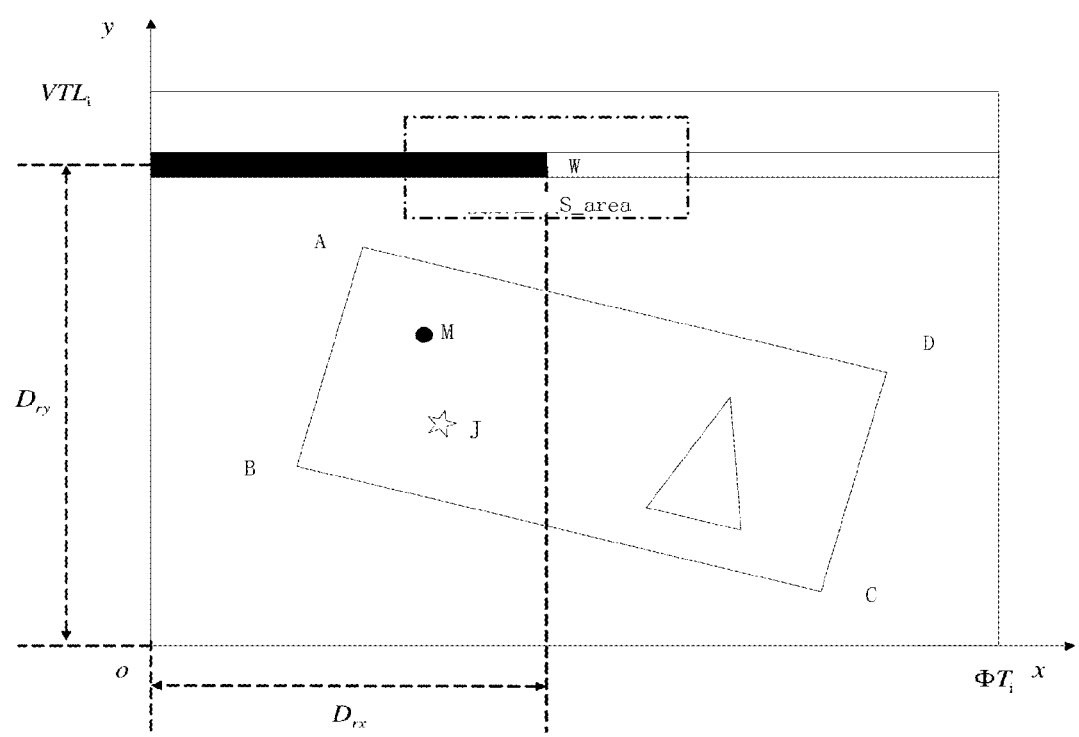
FIG. 8 is a schematic diagram of an image in a coordinate system xoy according to the present invention.

As shown in FIG. 8, the coordinate of W in the coordinate system xoy is obtained easily in a searching region S_area by using existing technique in conjunction with priori knowledge of the imaging position of the reference unit in the identifying system. It is assumed that $$\begin{cases} x_W = D_{rx} \\ y_W = D_{ry} \end{cases},$$

where Drx is the distance from W point to Y axis, and Dry is the distance from W point to X axis.

(2) determining the coordinate of the center W of the reference unit in a physical coordinate system $\overline{xoy}$.

Figure 9:
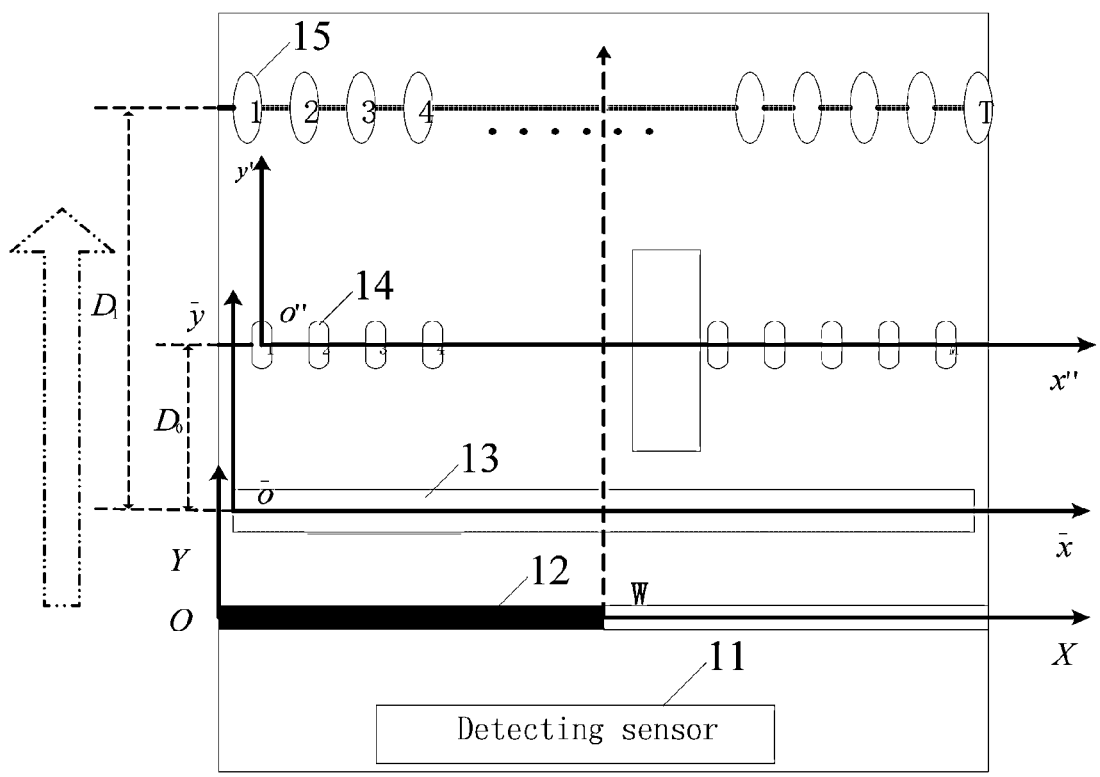
FIG. 9 is a schematic diagram of images in coordinate systems xoy, XOY and x"o"y" according to the present invention.

A physical dimension coordinate system $\overline{xoy}$ is set up (in which the left endpoint of the image sensor 13 is used as the origin, the horizontal direction of the image sensor 13 is used as abscissa direction, and the paper moving direction is used as ordinate direction), as shown in FIG. 9.

Assuming that the reference unit is still and the image sensor scans at a velocity opposite to the paper moving direction, the number of rows of pixels included from a fixed position of the image sensor to the center line Line_y in the vertical direction of the reference unit is:

$$VTL_i - D_{ry}.$$

Since the vertical resolution of the image sensor is $L_i$ dpi, the physical dimension distance between a straight line where the horizontal direction of the image sensor lies and the center line Line_y in the vertical direction of the reference unit is:

$$\frac{VTL_i - D_{ry}}{L_i}.$$

According to the horizontal resolution $T_i$ of the image sensor, it can be obtained that the coordinate of the center W of the reference unit in the physical coordinate system $\overline{xoy}$ is:

$$\begin{cases} \overline{x}_W = \dfrac{D_{rx}}{T_i} \\ \overline{y}_W = -\dfrac{VTL_i - D_{ry}}{L_i} \end{cases}.$$

That is to say, the physical dimension distance from the center W of the reference unit to the ordinate axis of the coordinate system $\overline{xoy}$ is $$\frac{D_{rx}}{T_i}.$$

(3) determining the coordinate of the center W of the reference unit in a physical coordinate system XOY.

The physical coordinate system XOY is set up (in which the left vertex of the reference unit 12 is used as the origin, the horizontal direction of the reference unit 12 is used as abscissa direction, and the paper moving direction is used as ordinate direction), as shown in FIG. 9. It can be obtained that the coordinate of the center W of the reference unit 12 in the coordinate system XOY is:

$$\begin{cases} X_W = \dfrac{D_{re}}{2} \\ Y_W = 0 \end{cases}.$$

That is to say, the physical dimension distance from the center W of the reference unit to the ordinate axis of the coordinate system XOY is $$\frac{D_{re}}{2}.$$

(4) determining the positional relationship between the physical coordinate system XOY and the physical coordinate system $\overline{xoy}$ (i.e., the physical relationship between the image sensor 13 and the reference unit 12). It is assumed that $$\frac{D_{re}}{2} > \frac{D_{rx}}{T_i},$$

that is to say, the left end of the reference unit 12 is closer to the left side than the left end of the image sensor 13, as shown in FIG. 9. Thus, the physical dimension coordinate system $\overline{x}$ $\overline{oy}$ and XOY meet the relationship:

$$\begin{cases} X = \overline{x} + \left(\frac{D_{re}}{2} - \frac{D_{rx}}{T_i}\right) \\ Y = \overline{y} + \left(\frac{VTL_i - D_{ry}}{L_i}\right) \end{cases} \quad \text{(Equation 8.1)}$$

Step 8.2, determining the physical positional relationship between the magnetic sensor and the reference unit.

(1) determining that the position of the magnetic signal data of the center W of the reference unit is in the numerical matrix of the whole magnetic signal data:

$$Mag = \begin{pmatrix} d_{00} & d_{01} & \cdots & d_{0,N-1} & d_{0N} \\ d_{10} & d_{11} & \cdots & d_{1,N-1} & d_{1N} \\ \vdots & \vdots & & \vdots & \vdots \\ d_{M-1,0} & d_{M-1,1} & \cdots & d_{M-1,N-1} & d_{M-1,N} \\ d_{M,0} & d_{M,1} & \cdots & d_{M,N-1} & d_{M,N} \end{pmatrix}.$$

The position of the magnetic signal data of W in the matrix Mag can be determined easily by using existing searching technique according to priori knowledge of the magnetic signal of the reference unit in the identifying system. It is assumed that the magnetic signal data at W is determined to be in the $D_{wy}$ and the $D_{wx}$ of the matrix Mag, i.e., $$W_{data} = Mag(D_{wy}, D_{wx}).$$

(2) determining the coordinate of the center W of the reference unit in a physical coordinate system x"o"y".

The coordinate system x"o"y" is set up (in which the position of the first left head of the magnetic sensor 14 is used as the origin, the horizontal direction of the image sensor 13 is used as abscissa direction, and the paper moving direction is used as ordinate direction), as shown in FIG. 9. Assuming similarly that the reference unit is still, it can be obtained from (1) in this section that the number of rows of the magnetic signal matrix collected is $D_{wy}$, when the magnetic sensor 14 scans to the center W of the reference unit 12 at a velocity opposite to the paper moving direction. According to the number of heads N of the magnetic sensor 14 and the vertical resolution $L_m$ dpi, the coordinate of W in the physical coordinate system x"o"y" is:

$$\begin{cases} x''_w = \frac{D_{wx}}{N} \cdot \Phi \\ y''_w = -\frac{D_{wy}}{L_m} \end{cases}.$$

(3) determining the positional relationship between the physical dimension coordinate system x"o"y" and the physical dimension coordinate system XOY (i.e., the positional relationship between the magnetic sensor 14 and the reference unit 12).

It is assumed that $$\frac{D_{re}}{2} > \frac{D_{wx}}{N} \cdot \Phi,$$

that is to say, the left end of the reference unit 12 is closer to the left side than the left end of the magnetic sensor 14, as shown in FIG. 9. Thus, the physical coordinate systems x"o"y" and XOY meet the relationship:

$$\begin{cases} X = x'' + \left(\frac{D_{re}}{2} - \frac{D_{wx}}{N} \cdot \Phi\right) \\ Y = y'' + \frac{D_{wy}}{L_m} \end{cases} \quad \text{(Equation 8.2)}$$

Step 8.3, determining the positional relationship between the magnetic sensor and the image sensor.

Generally, it is assumed that the image sensor 13 and the magnetic sensor 14 each is aligned ideally, that is to say, $T(\overline{x}\overline{oy}, x''o''y'')$ meets:

$$\begin{cases} x'' = \overline{x} \\ y'' = \overline{y} + \Delta y \end{cases}.$$

Where $\Delta y$ represents the spacing distance between the image sensor 13 and the magnetic sensor 14 along the transporting passage. However, due to the limitation of manufacturing process and long time usage of the identification system for valuable document, sensors are not aligned ideally with each other. By combining Equation 8.1 with Equation 8.2:

$$\begin{cases} X = \overline{x} + \left(\frac{D_{re}}{2} - \frac{D_{rx}}{T_i}\right) \\ Y = \overline{y} + \left(\frac{VTL_i - D_{ry}}{L_i}\right) \\ X = x'' + \left(\frac{D_{re}}{2} - \frac{D_{wx}}{N} \cdot \Phi\right) \\ Y = y'' + \frac{D_{wy}}{L_m} \end{cases}.$$

It is easy to obtain that the real positional relationship $\Pi(\overline{x}\overline{oy}, x''o''y'')$ between the physical coordinate system x"o"y" and the physical coordinate system $\overline{xoy}$ (i.e., the physical position corresponding relationship between the left end of the magnetic sensor 14 and the left end of the image sensor 13) is:

$$\begin{cases} x'' = \overline{x} + \left(\frac{D_{re}}{2} - \frac{D_{rx}}{T_i}\right) - \left(\frac{D_{re}}{2} - \frac{D_{wx}}{N} \cdot \Phi\right) \\ y'' = \overline{y} + \left(\frac{VTL_i - D_{ry}}{L_i}\right) - \frac{D_{wy}}{L_m} \end{cases},$$

which can be simplified as:

$$\begin{cases} x'' = \bar{x} + \left(\dfrac{D_{wx}}{N} \cdot \Phi - \dfrac{D_{rx}}{T_i}\right) \\ y'' = \bar{y} + \left(\dfrac{VTL_i - D_{ry}}{L_i}\right) - \dfrac{D_{wy}}{L_m} \end{cases} \quad \text{(Equation 8.3)}$$

It can be seen from Equation 8.3 that the positional relationship between the magnetic sensor 14 and the image sensor 13 is unrelated to the setting of the reference unit 12. That is to say, the reference unit 12 only serves as a transition bridge used to locate the position of the magnetic sensor 14 by using the position of the image sensor 13 in the identifying system, and causes no additional error to the identifying system.

Step 8.4, combination of the image signal and the magnetic signal, and locating of the magnetic signal by using the image signal.

Figure 10:
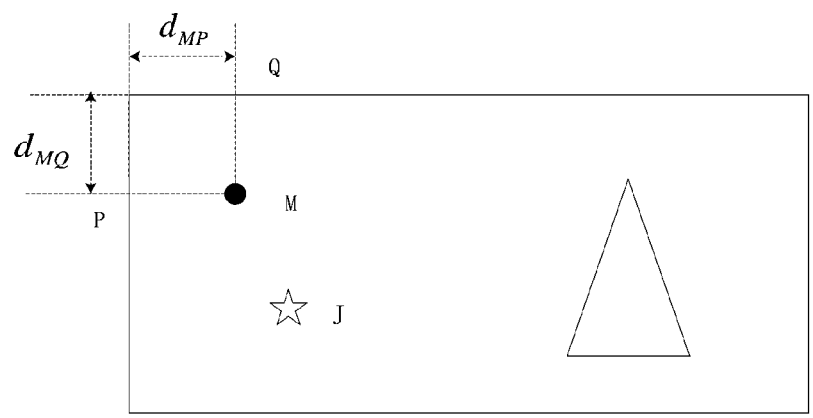
FIG. 10 is a schematic diagram of an image of a valuable document according to the present invention.

According to the result of the image identification (i.e., assuming that the current valuable document is a right-side-up and upright CNY 100 yuan) and the priori knowledge of the right-side-up and upright CNY 100 yuan, it is assumed that the physical distance from M to the upper edge of the current valuable document is $d_{MQ}$ and the physical distance from M to the left edge of the current valuable document is $d_{MP}$, as shown in FIG. 10.

Figure 11:
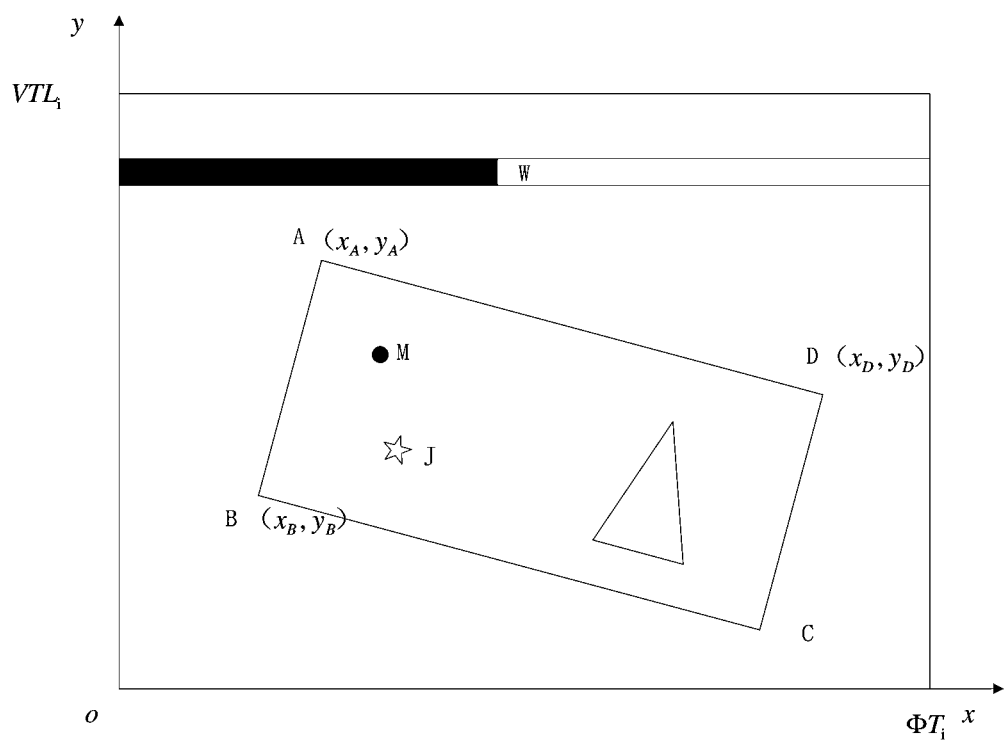
FIG. 11 is a schematic diagram of an image in a coordinate system xoy according to the present invention.

In the pixel coordinate system xoy, as shown in FIG. 11, by combining the straight line equation of the left boundary and the straight line equation of the upper boundary of the foreground region of the valuable document:

$$\begin{cases} y = k_1 x + b_1 \\ y = k_3 x + b_3 \end{cases},$$

the coordinate of the upper left vertex A in the pixel coordinate system is obtained and assumed as $(x_A, y_A)$ By combining the straight line equation of the left boundary and the straight line equation of the lower boundary of the foreground region of the valuable document:

$$\begin{cases} y = k_1 x + b_1 \\ y = k_4 x + b_4 \end{cases},$$

the coordinate of the lower left vertex B in the pixel coordinate system is obtained and assumed as $(x_B, y_B)$.

By combining the straight line equation of the right boundary and the straight line equation of the upper boundary of the foreground region of the valuable document:

$$\begin{cases} y = k_2 x + b_2 \\ y = k_3 x + b_3 \end{cases},$$

the coordinate of the upper right vertex D in the pixel coordinate system is obtained and assumed as $(x_D, Y_D)$.

Figure 12:
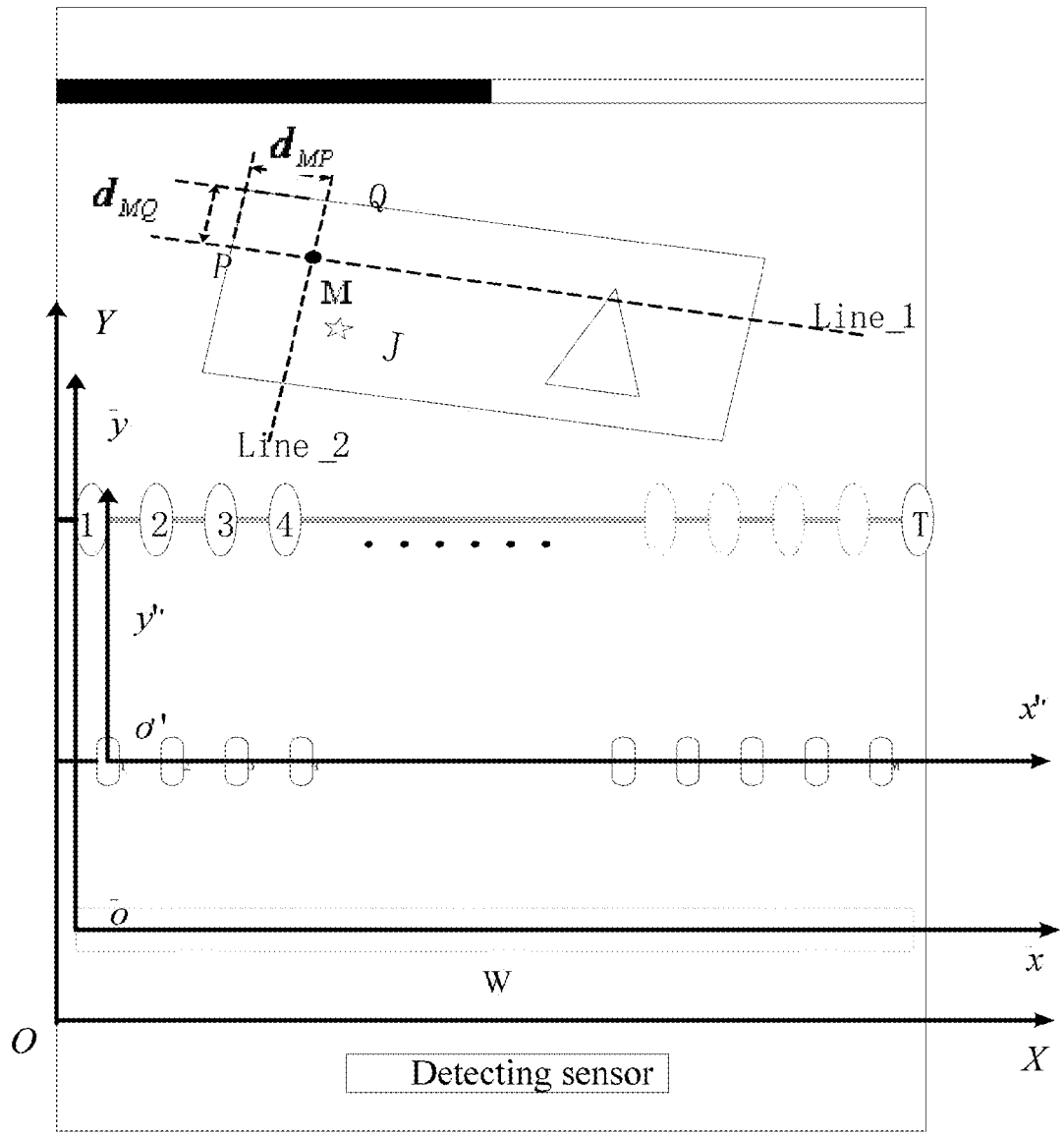
FIG. 12 is a schematic diagram of images in coordinate systems xoy, XOY and x"o"y" according to the present invention.

The position of the valuable document in the physical coordinate system $\overline{xoy}$ is as shown in FIG. 12 when the image sensor stops scanning (i.e., after time T second, the reference unit and the current valuable document all passes the image sensor, the magnetic sensor and the thickness sensor). According to the horizontal resolution $T_i$ dpi and the vertical resolution $L_i$ dpi of the image sensor, it can be obtained that the coordinates of the vertexes A, B and D of the valuable document in the physical dimension coordinate system $\overline{xoy}$ are:

$$\begin{cases} \bar{x}_A = \dfrac{x_A}{T_i} \\ \bar{y}_A = \dfrac{y_A}{L_i} \end{cases},$$

$$\begin{cases} \bar{x}_B = \dfrac{x_B}{T_i} \\ \bar{y}_B = \dfrac{y_B}{L_i} \end{cases},$$

$$\begin{cases} \bar{x}_D = \dfrac{x_D}{T_i} \\ \bar{y}_D = \dfrac{y_D}{L_i} \end{cases},$$

By using the coordinates of the upper left vertex $A^{(\bar{x}_A, \bar{y}_A)}$ and the upper right vertex $D^{(\bar{x}_D, \bar{y}_D)}$, it can be obtained that the straight line equation of the upper boundary of the current valuable document in the physical dimension coordinate system $\overline{xoy}$ is:

$$\bar{y} - \frac{\bar{y}_A}{L_i} = \frac{\frac{\bar{y}_D}{L_i} - \frac{\bar{y}_A}{L_i}}{\frac{\bar{x}_D}{T_i} - \frac{\bar{x}_A}{T_i}}\left(\bar{x} - \frac{\bar{x}_A}{T_i}\right),$$

which can be simplified as:

$$\bar{y} = \frac{T_i(\bar{y}_D - \bar{y}_A)}{L_i(\bar{x}_D - \bar{x}_A)}\bar{x} + \frac{\bar{x}_A \bar{y}_D - \bar{x}_D \bar{y}_A}{L_i(\bar{x}_D - \bar{x}_A)}.$$

The physical distance from M on the valuable document to the upper boundary of the valuable document is $d_{MQ}$, thus in the physical coordinate system $\overline{xoy}$, the straight line equation of line 1 (as shown in FIG. 12) which passes through M and is parallel to the upper boundary of the current valuable document is:

$$\bar{y} = \frac{T_i(\bar{y}_D - \bar{y}_A)}{L_i(\bar{x}_D - \bar{x}_A)}\bar{x} + \left[\frac{\bar{x}_A \bar{y}_D - \bar{x}_D \bar{y}_A}{L_i(\bar{x}_D - \bar{x}_A)} - d_{MQ}\sqrt{\left(\frac{T_i(\bar{y}_D - \bar{y}_A)}{L_i(\bar{x}_D - \bar{x}_A)}\right)^2 + 1}\right].$$

Letting:

$$k_{M1} = \frac{T_i(\bar{y}_D - \bar{y}_A)}{L_i(\bar{x}_D - \bar{x}_A)}, \text{ and}$$

$$b_{M1} = \frac{\bar{x}_A \bar{y}_D - \bar{x}_D \bar{y}_A}{L_i(\bar{x}_D - \bar{x}_A)} - d_{MQ}\sqrt{\left(\frac{T_i(\bar{y}_D - \bar{y}_A)}{L_i(\bar{x}_D - \bar{x}_A)}\right)^2 + 1},$$

the straight line equation of the line 1 is:

$$\bar{y} = k_{M1}\bar{x} + b_{M1} \quad \text{(Equation 8.4)}.$$

By using the coordinates of the upper left vertex $A^{(\bar{x}_A, \bar{y}_A)}$ and the lower left vertex $B^{(\bar{x}_B, \bar{y}_B)}$, it can be obtained that the straight line equation of the left boundary of the current valuable document in the physical coordinate system $\overline{xoy}$ is:

$$\overline{y} - \frac{\overline{y}_A}{L_i} = \frac{\frac{\overline{y}_B}{L_i} - \frac{\overline{y}_A}{L_i}}{\frac{\overline{x}_B}{T_i} - \frac{\overline{x}_A}{T_i}} \left( \overline{x} - \frac{\overline{x}_A}{T_i} \right),$$

which can be simplified as:

$$\overline{y} = \frac{T_i(\overline{y}_B - \overline{y}_A)}{L_i(\overline{x}_B - \overline{x}_A)} \overline{x} + \frac{\overline{x}_A \overline{y}_B - \overline{x}_B \overline{y}_A}{L_i(\overline{x}_B - \overline{x}_A)}.$$

So in the physical dimension coordinate system $\overline{xoy}$, the straight line equation of line 2 (as shown in FIG. 12) which passes through M and is parallel to the left boundary of the current valuable document is:

$$\overline{y} = \frac{T_i(\overline{y}_B - \overline{y}_A)}{L_i(\overline{x}_B - \overline{x}_A)} \overline{x} + \left[ \frac{\overline{x}_A \overline{y}_B - \overline{x}_B \overline{y}_A}{L_i(\overline{x}_B - \overline{x}_A)} + d_{MP} \sqrt{\left(\frac{T_i(\overline{y}_B - \overline{y}_A)}{L_i(\overline{x}_B - \overline{x}_A)}\right)^2 + 1} \right].$$

Letting:

$$k_{M2} = \frac{T_i(\overline{y}_B - \overline{y}_A)}{L_i(\overline{x}_B - \overline{x}_A)}, \text{ and}$$

$$b_{M2} = \frac{\overline{x}_A \overline{y}_B - \overline{x}_B \overline{y}_A}{L_i(\overline{x}_B - \overline{x}_A)} + d_{MP} \sqrt{\left(\frac{T_i(\overline{y}_B - \overline{y}_A)}{L_i(\overline{x}_B - \overline{x}_A)}\right)^2 + 1},$$

the straight line equation of line 2 is:

$$\overline{y} = k_{M2}\overline{x} + b_{M2} \quad \text{(Equation 8.5)}.$$

By combining the straight line Equations 8.4 and 8.5:

$$\begin{cases} \overline{y} = k_{M1}\overline{x} + b_{M1} \\ \overline{y} = k_{M2}\overline{x} + b_{M2} \end{cases},$$

it can be obtained that the coordinate of M on the current valuable document in the physical coordinate system $\overline{xoy}$ is:

$$\begin{cases} \overline{x}_M = \frac{b_{M1} - b_{M2}}{k_{M2} - k_{M1}} \\ \overline{y}_M = \frac{b_{M1}k_{M2} - b_{M2}k_{M1}}{k_{M2} - k_{M1}} \end{cases}.$$

According to the positional relationship between the physical coordinate system x"o"y" and the physical coordinate system $\overline{xoy}$ (i.e., the physical position corresponding relationship between the left endpoint of the magnetic sensor and the left endpoint of the image sensor) described in Equation 8.3, it can be obtained that the coordinate of M on the current valuable document in the physical dimension coordinate system x"o"y" is:

$$\begin{cases} x''_M = \overline{x}_M + \left(\frac{D_{re}}{2} - \frac{D_{rx}}{T_i}\right) - \left(\frac{D_{re}}{2} - \frac{D_{wx}}{N} \cdot \Phi\right) \\ y''_M = \overline{y}_M + \left(\frac{VTL_i - D_{ry}}{L_i}\right) - \frac{D_{wy}}{L_m} \end{cases}$$

That is:

$$\begin{cases} x''_M = \frac{b_{M1} - b_{M2}}{k_{M2} - k_{M1}} + \left(\frac{D_{wx}}{N} \cdot \Phi - \frac{D_{rx}}{T_i}\right) \\ y''_M = \frac{b_{M1}k_{M2} - b_{M2}k_{M1}}{k_{M2} - k_{M1}} + \left[\left(\frac{VTL_i - D_{ry}}{L_i}\right) - \frac{D_{wy}}{L_m}\right] \end{cases} \quad \text{(Equation 8.6)}$$

Letting:

$$d_M = \frac{x''_M}{\Phi} \cdot N = \left[\frac{b_{M1} - b_{M2}}{k_{M2} - k_{M1}} + \left(\frac{D_{wx}}{N} \cdot \Phi - \frac{D_{rx}}{T_i}\right)\right] \cdot \frac{N}{\Phi}, \text{ and}$$

$$d_N = y''_M \cdot L_m = \left[\frac{b_{M1}k_{M2} - b_{M2}k_{M1}}{k_{M2} - k_{M1}} + \left[\left(\frac{VTL_i - D_{ry}}{L_i}\right) - \frac{D_{wy}}{L_m}\right]\right] \cdot L_m,$$

the magnetic signal data of M being in row $R_M$ and column $C_M$ of the whole magnetic signal data matrix meets:
the position of rows: $R_M=[d_M]$ or $R_M=[d_M]+1$, and
the position of columns: $C_M=[d_N]$ or $C_M=[d_N]+1$.
Where $[\alpha]$ represents performing rounding operation on $\alpha$.
So far, the locating of the magnetic signal by using the reference unit as the transition bridge from the image sensor signal is achieved.

Step 8.5, precisely identifying the magnetic signal.
According to above locating, in the matrix of the whole magnetic signal matrix $$Mag = \begin{pmatrix} d_{00} & d_{01} & \cdots & d_{0,N-1} & d_{0N} \\ d_{10} & d_{11} & \cdots & d_{1,N-1} & d_{1N} \\ \vdots & \vdots & & \vdots & \vdots \\ d_{M-1,0} & d_{M-1,1} & \cdots & d_{M-1,N-1} & d_{M-1,N} \\ d_{M,0} & d_{M,1} & \cdots & d_{M,N-1} & d_{M,N} \end{pmatrix},$$

the data in row $R_M$ and column $C_M$ is the magnetic signal data at M on the current valuable document.
According to the assumption that the identification result is a right-side-up and upright RMB 100 yuan in the image identification, the magnetic signal data of the neighborhood of $Mag(R_M,C_M)$ are detected to determine whether they meet the magnetic signal rule of real right-side-up and upright RMB 100 yuan at M.
If the magnetic signal data of the neighborhood of Mag $(R_M,C_M)$ meet the magnetic signal rule at M on the real right-side-up and upright RMB 100 yuan, it is determined that the magnetic signal identification result is also a RMB 100 yuan, which is in conformity with the image identification result.
Otherwise, it is determined that the magnetic signal identification result is not a RMB 100 yuan, which is not in conformity with the image identification result. Therefore, the current valuable document is a fake RMB 100 yuan, and will be rejected.
Second Embodiment
This embodiment gives specific introduction of a device for identifying a valuable document according to the present invention.

Figure 13:
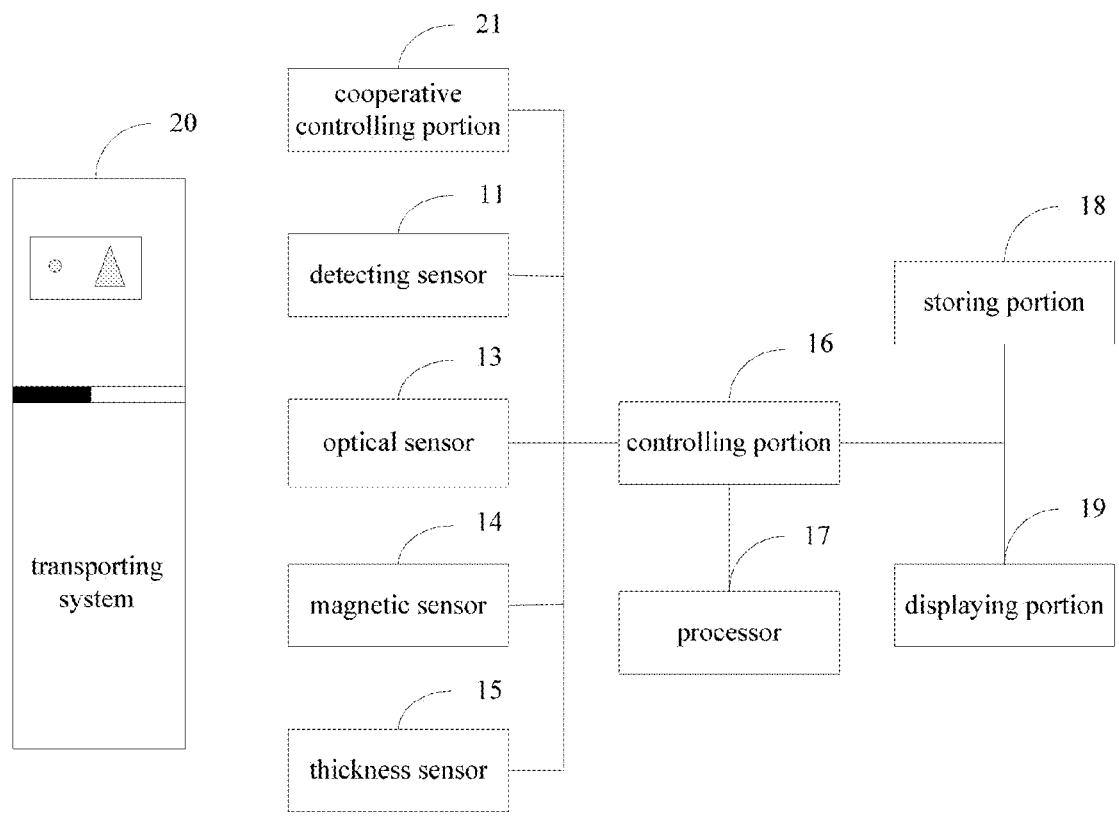
FIG. 13 is a schematic block diagram of another device for identifying a valuable document according to the present invention.

Referring to FIG. 13, the device for identifying a valuable document includes the following portions.

A controlling portion 16, adapted to control the work flow of the whole device.

Figure 14:
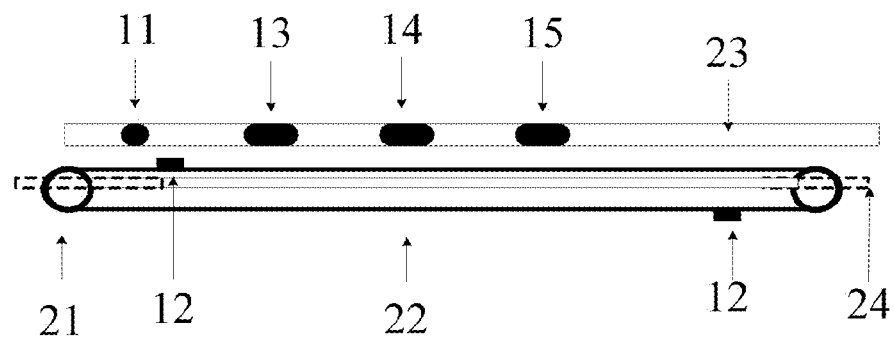
FIG. 14 is a side view of a transporting system according to the present invention.
Figure 15:
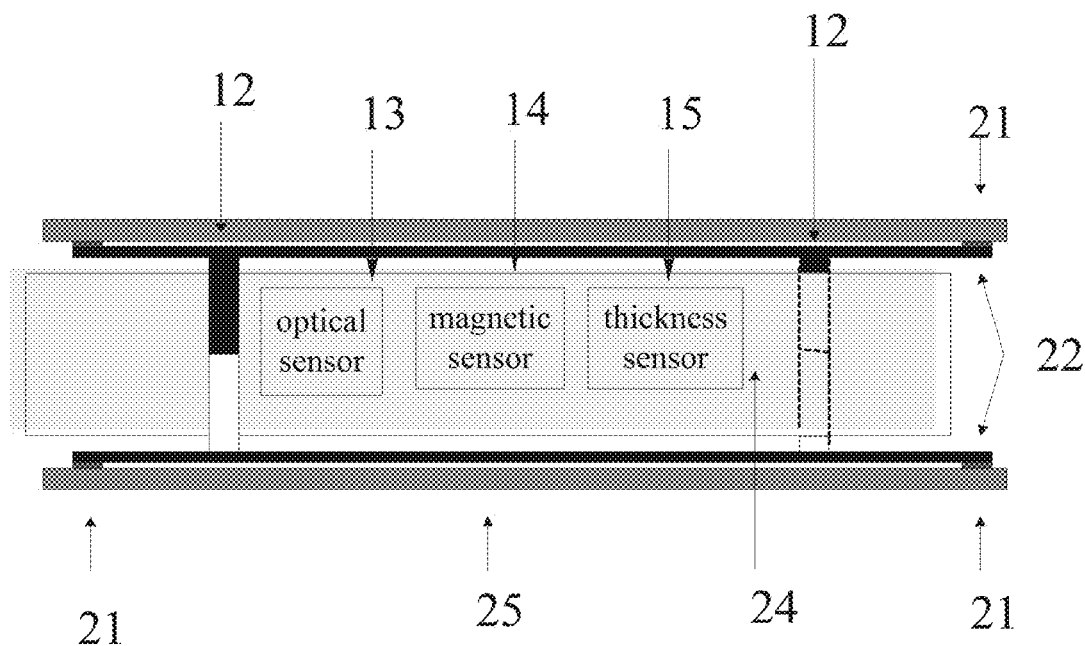
FIG. 15 is a plan view of a transporting system according to the present invention.

A transporting system 20, referred to FIG. 14 and FIG. 15 for the specific details of the transporting system. At least two sensors adapted to acquire machine readable information are installed on an upper wall 23 of the transporting system passage. Ends of two close-loop type conveyor belts 22 are fixed to a side wall 25 of the passage through a transmission shaft, and the transmission shaft 21 drives the conveyor belt 22 to run when a valuable document is being transported in the transporting passage. In the present invention, the preferable sensors are as follows.

Figure 16:
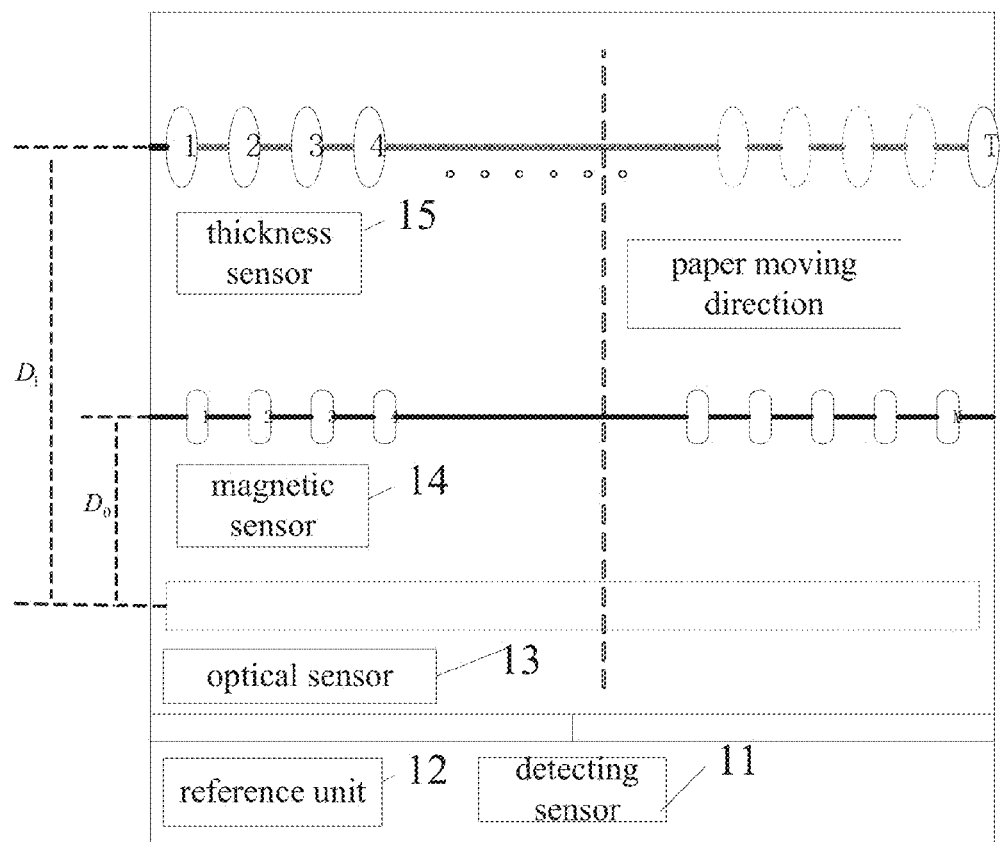
FIG. 16 is a schematic diagram of sensor distribution according to the present invention.

An image sensor 13, adapted to acquire image data of a valuable document placed in transmission and reflection. As shown in FIG. 16, it is assumed that the horizontal width, the horizontal resolution and the vertical resolution of the image sensor 13 in the present embodiment are $\Phi$ inch, $T_i$ dpi and $L_i$ dpi, respectively.

A magnetic sensor 14, i.e., a magnetic signal data acquiring portion, adapted to acquire magnetic signal data of the valuable document placed. As shown in FIG. 16, it is assumed that the magnetic sensor 14 has N heads evenly distributed in the horizontal direction with a width of $\Phi$ inch and the vertical resolution of the magnetic sensor is $L_m$ dpi.

A thickness signal 15, i.e., a thickness data acquiring portion, adapted to acquire thickness data of the valuable document placed. As shown in FIG. 16, it is assumed that the thickness sensor 15 has T thickness sensing heads evenly distributed in the horizontal direction with a width of $\Gamma$ inch and the vertical resolution of the magnetic sensor is $L_t$ dpi.

Figure 17:
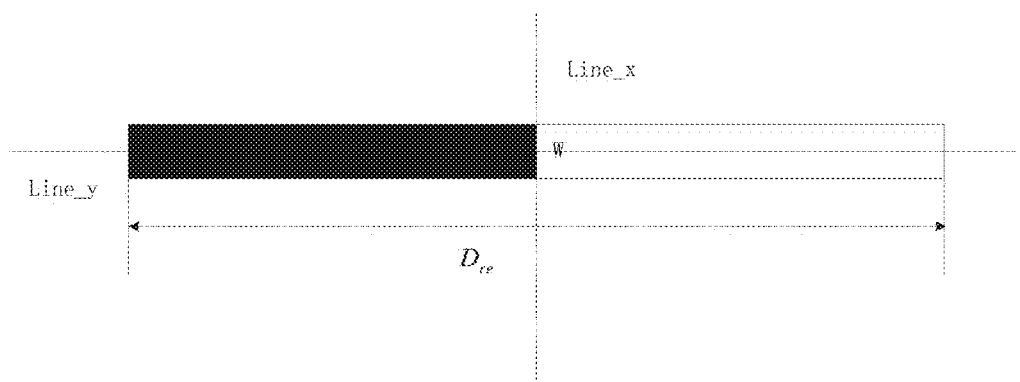
FIG. 17 is a schematic diagram of a reference unit according to the present invention.

A reference unit 12, i.e., two rectangular reference units adapted to determine spatial position relationship between different sensors. As shown in FIG. 17, it is assumed that the physical dimension length, center line in the horizontal direction, center line in the vertical direction and the intersection of both center lines are $D_{re}$, Line_x, Line_y and W, respectively, then W is the center of the reference unit. Each end of the reference unit 12 touches with each of the two close-loop type conveyor belts, and the reference unit moves with the movement of the conveyors when the conveyors are moving, as shown in FIG. 14 and FIG. 15.

The reference unit has the following features:

(1) the reference unit has the center line as a dividing line, the left half portion is dark (nontransparent), and the right half portion is transparent;

(2) the dark portion of the reference unit can be magnetized; and (3) the thickness of the dark portion (left half portion) is significantly greater than that of the transparent portion (right half portion).

When the valuable document is transported on the transporting passage, the reference unit is attached on the conveyor belt and passes by the image sensor, the magnetic sensor and the thickness sensor at the same speed as the valuable document; that is to say, signals collected by the image sensor, the magnetic sensor and the thickness sensor each time include both a signal of the reference unit and a signal of the current valuable document.

A cooperative controlling portion 21, as shown in FIG. 13, adapted to cooperatively control the linear speed of the close-loop type conveyor belt to be equal to the transporting speed of the valuable document, so that the transporting speed of the reference unit will be the same as the transporting speed of the valuable document.

Moreover, the cooperative controlling portion 21 controls the reset of the reference unit, that is, the cooperative controlling portion controls the close-loop type conveyor belt to transport the reference unit to a specified starting position after the signal collection of each valuable document is finished, as shown in FIG. 14 and FIG. 15. The starting position is located between the detecting sensor and the image sensor.

A storing portion 18, adapted to store a standard template needed to identify the image signal of the current valuable document.

A processor 17, adapted to identify the image signal, the magnetic signal and the thickness signal to achieve the identification of the current valuable document.

A displaying portion 19, adapted to display information such as currency, denomination, version and the like if the current valuable document (e.g., banknote) is identified as a legal document (e.g., authentic banknote); and adapted to display "Not Accept!" if the current valuable document is unauthentic.

Figure 18:
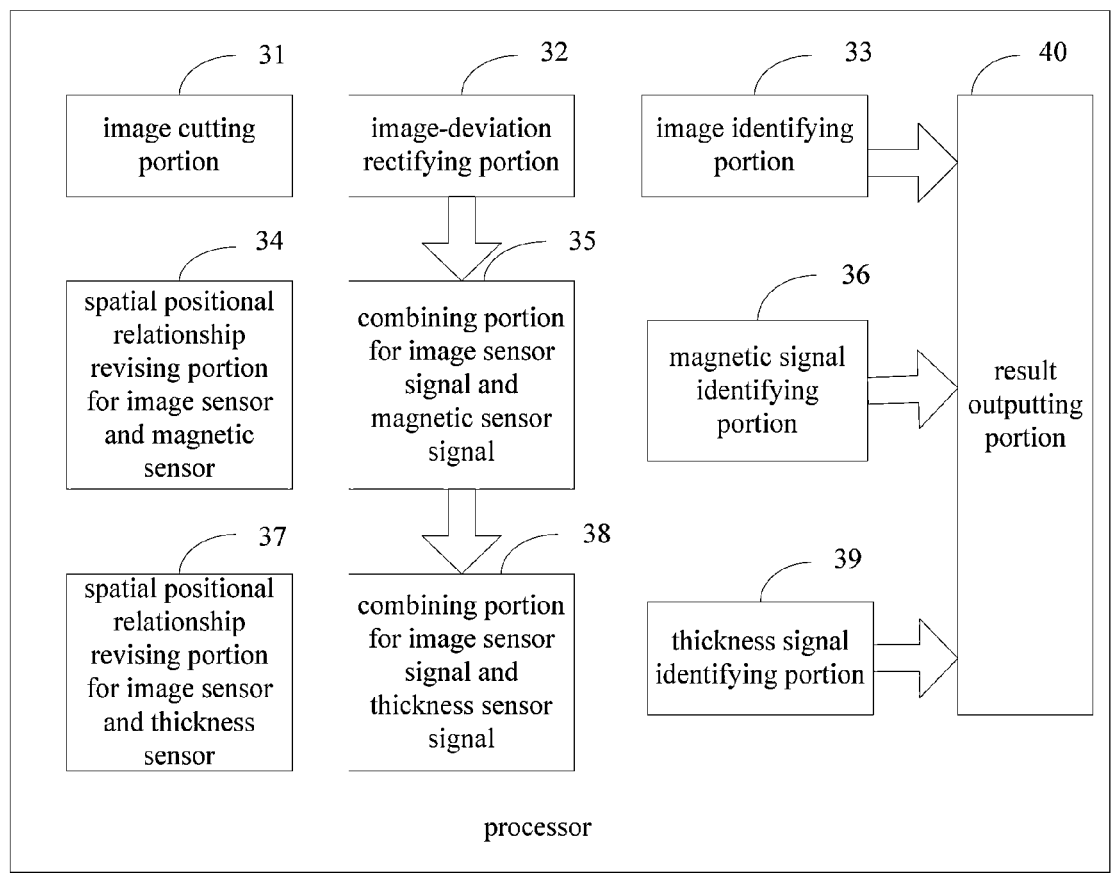
FIG. 18 is a block diagram of a processor according to the present invention.

The device for identifying a valuable document according to the present invention further includes:

a detecting sensor 11, provided at a starting position of a transporting wall, and adapted to detect the arrival of the valuable document and to trigger other sensors to work, as shown in FIG. 14 and FIG. 15;

As shown in FIG. 18, the processor 17 according to the present invention further includes the following modules (soft modules belonging to the processor).

An image cutting portion 31, adapted to cut a foreground region which is useful for identification from a background region.

An image-deviation rectifying portion 32, adapted to judge whether the foreground region is inclined and deviated, and to perform image-deviation rectification using existing correcting technique.

An image identifying portion 33, adapted to perform matching and identifying according to the image data of the current valuable document and the standard template stored in the storing portion.

A spatial positional relationship revising portion 34 for the image sensor and the magnetic sensor, adapted to revise the spatial positional relationship between the image sensor and the magnetic sensor by using the distribution characteristics of the image of the reference unit in the whole image collected by the image sensor and the distribution characteristics of the magnetic signal of the reference unit in the whole magnetic signal collected by the magnetic sensor, to obtain the practical position constraint between the two sensors at the present position.

A combining portion 35 for image information and magnetic information, the image information and the magnetic information are description of different types of information of the same medium to be identified collected by different types of data collection units. Although they are different types of information, there is a correlation between them. Because the printing of a valuable document is extremely precise, that is to say, the physical position distribution of the image information (especially, image feature information) and the magnetic signal (especially, magnetic feature signal) on the same kind of valuable document is extremely steady and reliable, moreover, the transporting speed of the current valuable document, the distribution position and resolution of the image sensor and the magnetic sensor are constant. Since transporting speed of the current valuable document, the distribution position and resolution of the image sensor and the magnetic sensor are constant, the effective magnetic signal distribution of the current valuable document can be calculated according to the image information in conjunction with the corresponding relationship in physical position of the image sensor and the magnetic sensor.

A magnetic signal identifying portion 36, adapted to identify the magnetic signal of the current valuable document based on above multiple information combination, to obtain a magnetic signal identification result of the current valuable document.

A spatial positional relationship revising portion 37 for the image sensor and the thickness sensor, adapted to revise the spatial positional relationship between the image sensor and the thickness sensor by using the distribution characteristics of the image of the reference unit in the whole image collected by the image sensor and the distribution characteristics of the thickness signal of the reference unit in the whole thickness signal collected by the thickness sensor, to obtain the practical position constraint between the two sensors at the present conditions.

A combining portion 38 for image information and thickness information, the image information and the thickness information are description of different types of information of the same medium to be identified collected by different types of data collection units. There is similar relationship as the relationship between the image information and the magnetic signal between the image information and the thickness information. By using the relationship between the image information and the thickness information, the effective thickness signal distribution of the current valuable document can be calculated according to the image information in conjunction with the corresponding relationship between the physical position of the image sensor and the physical position of the thickness sensor.

A thickness signal identifying portion 39, adapted to identify the thickness signal of the current valuable document based on above multiple information combination, to obtain the thickness signal identification result of the current valuable document.

A result outputting portion 40, adapted to output the final identification result of the current valuable document.

The implementation flow of the present invention is as shown in FIG. 18.

In the device for identifying a valuable document according to the present invention, the image sensor, the magnetic sensor and the thickness sensor obtain respectively detecting data of the reference unit and the current valuable document in time series. In the device for identifying a valuable document according to the present invention, the transporting speed of the current valuable document is constant, and the spatial distribution position of the image sensor, the magnetic sensor and the thickness sensor are fixed, thus with the present invention, the practical spatial positional relationship between the image sensor, the magnetic sensor and the thickness sensor is determined by using the image signal, the magnetic signal and the thickness signal of the reference unit at first, then the signals acquired by the image sensor, the magnetic sensor and the thickness sensor are combined by using the positional relationship between the sensors, to obtain description and identification of consistency of the current valuable document.

In conjunction with components of the above device, the working flow of these components is briefly described as follows.

Step S21, placing a valuable document (e.g., banknote) to be identified. The flow begins.

Step S22, processing by the image sensor. A reference unit and a current valuable document are scanned by the image sensor to obtain image information of the reference unit and the current valuable document.

Step S23, processing by the magnetic sensor. Magnetic signal data of the reference unit and the current valuable document are obtained by the magnetic sensor.

Step S24, processing by the thickness sensor. Thickness signal data of the reference unit and the current valuable document are obtained by the thickness sensor.

Step S25, cutting an image. The positional relationship between a current foreground region in a whole background region is determined at first, and the image foreground region which is useful for identification is cut from the background region.

Step S26, correcting the image. Inclined and deviated images are corrected to facilitate subsequent image matching and identifying.

Step S27, identifying the image. The foreground region of the valuable document obtained by image cutting is placed in a coordinate system, and image data of a specific position is selected to be matched and identified with standard template data stored in a storing portion to obtain an identification result. If image identification fails, the current valuable document is exited.

Step S28, revising the physical positional relationship between the image sensor and the magnetic sensor. The displacements of the left vertex of the image sensor and the left vertex of the magnetic sensor in horizontal direction and in vertical direction are obtained by using the image signal and the magnetic signal of the reference unit, thus the practical constraint relationship between the image sensor and the magnetic sensor is obtained.

Step S29, combining image information and magnetic information. Since the transporting speed of the current valuable document is constant, by using the position (distribution) of the foreground region of the current valuable document in the background image, the position (distribution) of the effective magnetic signal of the current valuable document in the whole magnetic signal is calculated according to the physical position constraint relationship between the image sensor and the magnetic sensor as well as the image identification result.

Step S30, identifying a magnetic signal. It is determined whether the magnetic signal data in the specific position collected by the magnetic sensor meet the magnetic signal distribution rule required by the image identification result of the current valuable document. If the magnetic signal identifying fails, the current valuable document is exited.

Step S31, revising the physical positional relationship between the image sensor and the thickness sensor. The displacements of the left vertex of the image sensor and the left vertex of the thickness sensor in horizontal direction and in vertical direction are obtained by using the image signal and the thickness signal of the reference unit, thus the practical constraint relationship between the image sensor and the thickness sensor is obtained.

Step S32, combining image information and thickness information. Since the transporting speed of the current valuable document is constant, and the physical position relationship between the image sensor and the thickness sensor is constant, By using the position (distribution) of the effective region of the current valuable document in the background image, the position (distribution) of the effective thickness signal of the current valuable document in the whole thickness signal is calculated according to the image identification result.

Step S33, identifying thickness signal. It is determined whether the thickness signal data in the specific position collected by the thickness sensor meet the thickness signal distribution rule required by the image identification result of the current valuable document. If the thickness signal identifying fails, the current valuable document is exited.

Step S34, if the thickness identifying succeeds, the identification of the current valuable document is completed and the identification result (e.g., currency, denomination, version and the like) is output.

It is noted that, the embodiments shown in FIG. 1 to FIG. 18 are only preferable embodiments described in the present invention, and more embodiments can be designed by those skilled in the art, which will not be repeated herein.

It will be apparent to those skilled in the art that various modifications of the above embodiments can be made, and the general principal defined in the present disclosure can be achieved in other embodiments without departing from the spirit and scope of the disclosure. Therefore, the present disclosure is not limited to these embodiments described above, but accords with the widest scope in accordance with the principal and novel features disclosed in the present disclosure.

The invention claimed is:

1. A method for identifying a valuable document, comprising:
    collecting an image signal and a first signal of a detection object by an image sensor and a first sensor respectively, wherein the detection object comprises the valuable document and a reference unit;
    determining an image signal of the valuable document from the image signal of the detection object;
    determining a positional relationship between the image sensor and the first sensor according to a positional relationship between the image sensor and the reference unit and a positional relationship between the first sensor and the reference unit, if an image signal of the valuable document on a preset region matches with an image signal of template information on the preset region, wherein the template information comprises an image signal and a second signal;
    determining the second signal of the template information at a preset position;
    determining a positional relationship between the preset position on the detection object and the image sensor;
    determining a positional relationship between the preset position on the detection object and the first sensor according to the positional relationship between the image sensor and the first sensor; and
    judging whether the first signal of the detection object at the preset position collected by the first sensor is the same as the second signal of the template information at the preset position, and if the first signal of the detection object at the preset position collected by the first sensor is the same as the second signal of the template information at the preset position, displaying that the valuable document is real; otherwise, displaying that the valuable document is fake.

2. The method for identifying a valuable document according to claim 1, wherein the first sensor is a magnetic sensor, and each of the first signal and the second signal is a magnetic signal.

3. The method for identifying a valuable document according to claim 1, wherein the first sensor is a thickness sensor, and each of the first signal and the second signal is a thickness signal.

4. The method for identifying a valuable document according to claim 1, wherein the first sensor comprises a magnetic sensor and a thickness sensor, and each of the first signal and the second signal comprises a magnetic signal and a thickness signal.

5. A device for identifying a valuable document, comprising:
    an image sensor, adapted to collect an image signal of a detection object, wherein the detection object comprises the valuable document and a reference unit;
    a first sensor, adapted to collect a first signal of the detection object;
    a first determining module, adapted to determine an image signal of the valuable document from the image signal of the detection object;
    a second determining module, adapted to determine a positional relationship between the image sensor and the first sensor according to a positional relationship between the image sensor and the reference unit and a positional relationship between the first sensor and the reference unit, if an image signal of the valuable document on a preset region matches with an image signal of template information on the preset region, wherein the template information comprises an image signal and a second signal;
    a third determining module, adapted to determine the second signal of the template information at a preset position;
    a fourth determining module, adapted to determine a positional relationship between the preset position on the detection object and the image sensor;
    a fifth determining module, adapted to determine a positional relationship between the preset position on the detection object and the first sensor according to the positional relationship between the image sensor and the first sensor;
    a judging module, adapted to judge whether the first signal of the detection object at the preset position collected by the first sensor is the same as the second signal of the template information at the preset position; and
    a displaying module, adapted to display that the valuable document is real or fake.

6. The device for identifying a valuable document according to claim 5, wherein the first sensor is a magnetic sensor, and each of the first signal and the second signal is a magnetic signal.

7. The device for identifying a valuable document according to claim 5, wherein the first sensor is a thickness sensor, and each of the first signal and the second signal is a thickness signal.

8. The device for identifying a valuable document according to claim 5, wherein the first sensor comprises a magnetic sensor and a thickness sensor, and each of the first signal and the second signal comprises a magnetic signal and a thickness signal.

* * * * *